United States Patent
Zhang et al.

(10) Patent No.: US 10,292,154 B2
(45) Date of Patent: May 14, 2019

(54) COMMUNICATION ESTABLISHMENT METHOD, MOBILE STATION AND TRANSFER DEVICE BASED ON TRANSFER MODE

(71) Applicant: Hytera Communications Corp., Ltd., Shenzhen, Guangdong (CN)

(72) Inventors: Yingzhe Zhang, Guangdong (CN); Chia Han Siong Samuel, Guangdong (CN); Yan Xu, Guangdong (CN); Yang Yu, Gunagdong (CN)

(73) Assignee: Hytera Communications Corporation Limited, Shenzhen, Guangdong (CN)

( * ) Notice: Subject to any disclaimer, the term of this patent is extended or adjusted under 35 U.S.C. 154(b) by 365 days.

(21) Appl. No.: 14/915,051

(22) PCT Filed: Aug. 14, 2014

(86) PCT No.: PCT/CN2014/084363
§ 371 (c)(1),
(2) Date: Feb. 26, 2016

(87) PCT Pub. No.: WO2015/027822
PCT Pub. Date: Mar. 5, 2015

(65) Prior Publication Data
US 2016/0212742 A1 Jul. 21, 2016

(30) Foreign Application Priority Data
Aug. 27, 2013 (CN) .......................... 2013 1 0379265

(51) Int. Cl.
*H04W 72/04* (2009.01)
*H04W 76/10* (2018.01)
(Continued)

(52) U.S. Cl.
CPC ..... *H04W 72/0446* (2013.01); *H04W 28/065* (2013.01); *H04W 56/001* (2013.01);
(Continued)

(58) Field of Classification Search
CPC ............. H04W 72/0446; H04W 76/10; H04W 28/065; H04W 56/001; H04W 72/0406
See application file for complete search history.

(56) References Cited

U.S. PATENT DOCUMENTS

2011/0026514 A1  2/2011  Tay
2011/0205939 A1  8/2011  Yu et al.
(Continued)

FOREIGN PATENT DOCUMENTS

CN   101689919 A   3/2010
CN   103024788 A   4/2013
(Continued)

OTHER PUBLICATIONS

Extended European Search Report, dated Jul. 27, 2016, from related European Application No. 14839002.4.
(Continued)

*Primary Examiner* — Christopher M Crutchfield
*Assistant Examiner* — Tito Q Pham
(74) *Attorney, Agent, or Firm* — Wolf, Greenfield & Sacks, P.C.

(57) ABSTRACT

A communication establishment method, mobile station and transfer device based on transfer mode. The method comprises: a first mobile station sends to the transfer device control information including the slot used by the first mobile station and the control signalings corresponding to different service types, in order that the transfer device determines a transfer slot and gets ready for communication according to the control signalings; and the first mobile station communicates with a target mobile station group
(Continued)

through the transfer slot. The transfer device can accurately acquire the slot used by the mobile station, thus reducing communication error rate and solving the problem that the transfer device can not identify the slot in the use of the mobile station and can not support delayed access. Meanwhile, the technical solution can be compatible with existing transfer device and mobile station.

7 Claims, 8 Drawing Sheets

(51) Int. Cl.
    *H04W 28/06*     (2009.01)
    *H04W 56/00*     (2009.01)
(52) U.S. Cl.
    CPC ....... *H04W 72/0406* (2013.01); *H04W 76/10* (2018.02); *H04W 72/04* (2013.01)

(56) References Cited

U.S. PATENT DOCUMENTS

| | | | | |
|---|---|---|---|---|
| 2012/0002684 | A1* | 1/2012 | Tay | H04W 56/00 370/503 |
| 2013/0021965 | A1* | 1/2013 | Chu | H04W 4/10 370/328 |
| 2013/0329573 | A1* | 12/2013 | Chen | H04L 1/1806 370/246 |

FOREIGN PATENT DOCUMENTS

| | | |
|---|---|---|
| CN | 103139792 A | 6/2013 |
| CN | 103428895 A | 12/2013 |
| EP | 2190235 A1 | 5/2010 |
| EP | 2221980 A1 | 8/2010 |
| EP | 2651047 A1 | 10/2013 |
| WO | WO 2010/034163 A1 | 1/2010 |
| WO | WO 2012/077971 A2 | 6/2012 |

OTHER PUBLICATIONS

"Electromagnetic compatibility and Radio spectrum Matters (ERM); Digital Mobile Radio (DMR) Systems; Part 1: DMR Air Interface (AI) Protocol," Techincal Specification, European Telecommunications Standards Institute (ETSI); (2013).
"Electromagnetic compatibility and Radio spectrum Matters (ERM); Digital Mobile Radio (DMR) Systems; Part 2: DMR voice and generic services facilities," Techincal Specification, European Telecommunications Standards Institute (ETSI); (2013) sections 3.1, 5.2.1.2.2, 5.2.2.2.2.
International Search Report, dated Oct. 25, 2014, from corresponding International Application No. PCT/CN2014/084363.

* cited by examiner

COMMUNICATION ESTABLISHMENT METHOD, MOBILE STATION AND TRANSFER DEVICE BASED ON TRANSFER MODE

CROSS-REFERENCE TO RELATED APPLICATIONS

This application is a National Stage application of PCT international application PCT/CN2014/084363, filed on Aug. 14, 2014, which claims priority to Chinese Patent Application No. 201310379265.2 titled "COMMUNICATION ESTABLISHMENT METHOD, MOBILE STATION AND TRANSFER DEVICE BASED ON TRANSFER MODE" and filed with the Chinese State Intellectual Property Office on Aug. 27, 2013, both of which are incorporated herein by reference in entirety.

FIELD

The present disclosure relates to the field of communication technology, and in particular to a method for communication establishment, a mobile station and a transfer device based on a transfer mode.

BACKGROUND

A mobile station establishes communications mainly in a direct mode and in a transfer mode. In the transfer mode, different mobile stations establish communications through a transfer device (a base station or a transfer station), and proper timeslot synchronization between a mobile station which triggers communications and the transfer device is essential to establish correct communications between different mobile stations. For example, timeslots of the transfer device includes timeslot 1 and timeslot 2 (the timeslot number may be user-defined, and the number of the timeslots of the transfer device is determined based on an applied communication standard), and timeslots available for the mobile station are timeslot 1 and timeslot 2 (the timeslot number may be also user-defined) respectively. If a preset synchronization rule is that timeslot 1 of the transfer device is synchronized with timeslot 1 of the mobile station, and the mobile station distributes timeslot 1 as a communication timeslot, other mobile stations operating at timeslot 1 may properly receive and analyze a signal only in a case that the mobile station transmits information at timeslot 1 and the transfer device transfers the information at timeslot 1. Similarly, if a preset synchronization rule is that timeslot 2 of the transfer device is synchronized with timeslot 2 of the mobile station, and the mobile station distributes timeslot 2 as a communication timeslot, other mobile stations operating at timeslot 2 may properly receive and analyze a signal only in a case that the mobile station transmits information at timeslot 2 and the transfer device transfers the information at timeslot 2.

In current DMR and PDT standards, a method for establishing communications between the mobile stations based on a transfer mode is defined as follows.

When the mobile station which triggers a communication service (referred to as the mobile station) communicates with other mobile stations via a transfer device, the mobile station directly transmits control information and service information to the transfer device, where the control information is mainly used for the transfer device and the other mobile stations to obtain a service type, and to get ready for the communications corresponding to the service type. The transfer device directly transfers the service information after receiving the service information. When transferring the service information, the transfer device only transfers the service information at a currently default operating timeslot, since the transfer device does not know and cannot obtain the timeslot used by the mobile station.

SUMMARY

Applicant finds that, there are some defects in conventional methods for communication establishment based on a transfer mode, i.e., a transfer device cannot obtain a timeslot used by a mobile station, and can only transfer at a default operating timeslot, which may cause an error in timeslot synchronization between the mobile station and the transfer device, so that some mobile stations cannot receive service information correctly. If the transfer device has two optional timeslots, a probability of this problem is basically 50%. The larger the number of timeslots of the transfer device, the higher the error rate for communication link establishment, which is far from enough to satisfy the requirements of communication system performance.

Thus, a method for communication establishment, a mobile station and a transfer device based on a transfer mode are provided according to embodiments of the disclosure, to address the issue of high error rate (low communication success rate) for communication link establishment between the mobile stations due to the transfer device being unaware of the timeslot used by the mobile station in conventional technology.

In view of this, a method for communication establishment, a mobile station and a transfer device based on a transfer mode are provided in the disclosure. The technical solution is provided as follows.

A method for communication establishment based on a transfer mode is provided. The method includes:

transmitting, by a first mobile station, control information to a transfer device, where the control information includes a timeslot used by the first mobile station and a control signaling corresponding to a service type, so that the transfer device determines a transfer timeslot and gets ready for communications based on the control signaling, and the transfer timeslot is a timeslot of the transfer device which is synchronous with the timeslot used by the first mobile station; and communicating, by the first mobile station, with a target mobile station group at the transfer timeslot, where the target mobile station group includes at least one mobile station.

A mobile station is further provided. The mobile station includes a transmitting module and a communication establishment module.

The transmitting module is configured to transmit control information to a transfer device, where the control information includes a timeslot used by a first mobile station and a control signaling corresponding to a service type, so that the transfer device determines a transfer timeslot and gets ready for communications based on the control signaling, where the transfer timeslot is a timeslot of the transfer device which is synchronous with the timeslot used by the first mobile station.

The communication establishment module is configured to communicate with a target mobile station group at the transfer timeslot, where the target mobile station group includes at least one mobile station.

A method for communication establishment based on a transfer mode is further provided. The method includes:

receiving, by a transfer device, control information transmitted from a first mobile station, where the control information includes a timeslot used by the first mobile station and a control signaling corresponding to a service type;

determining, by the transfer device, a transfer timeslot based on the control information, and getting ready for communications based on a control signaling, wherein, the transfer timeslot is a timeslot of the transfer device which is synchronous with a timeslot used by the first mobile station; and transferring, by the transfer device, information between the first mobile station and a target mobile station group at the transfer timeslot when the first mobile station communicates with the target mobile station group at the transfer timeslot, where the target mobile station group includes at least one mobile station.

A transfer device is further provided. The device includes a receiving module, a synchronizing module, and a transferring module.

The receiving module is configured to receive control information transmitted from a first mobile station, where the control information includes a timeslot used by the first mobile station and a control signaling corresponding to a service type.

The synchronizing module is configured to determine a transfer timeslot based on the control information and gets ready for communications based on the control signaling.

The transferring module is configured to transfer information between the first mobile station and the target mobile station group at the transfer timeslot for the first mobile station to communicate with a target mobile station group at the transfer timeslot, where the target mobile station group includes at least one mobile station.

A system for communication establishment based on a transfer mode is provided. The system includes at least two mobile stations according to any of the mobile stations mentioned above and transfer devices according to any of the transfer devices mentioned above.

In the technical solution of the disclosure, when the service of the first mobile station is triggered, the first mobile station transmits the control information to the transfer device. The control information includes the timeslot used by the first mobile station and the control signaling corresponding to the service type. Since the control information includes the timeslot used by the first mobile station, the transfer device may determine a timeslot to be used after receiving the control information transmitted by the mobile station, and get ready for communications based on the control signaling in the control information. Subsequently, the first mobile station may communicate with the target mobile station group at the transfer timeslot. When the communications are established, the transfer device may exactly obtain information of the timeslot used by a communication initiator, and the transfer device may transfer at a correct transfer timeslot when the service begins, thereby achieving accurate communications between the mobile stations, and reducing an error rate.

BRIEF DESCRIPTION OF THE DRAWINGS

In order to illustrate clearly technical solutions in embodiments of the present disclosure or a conventional technology, drawings used in the embodiments or the conventional technology are illustrated briefly. Obviously, the drawings described below are only some embodiments recited in the present application, and other drawings can be obtained by those skilled in the art based on these drawings without any creative work.

DETAILED DESCRIPTION

Figure 1:
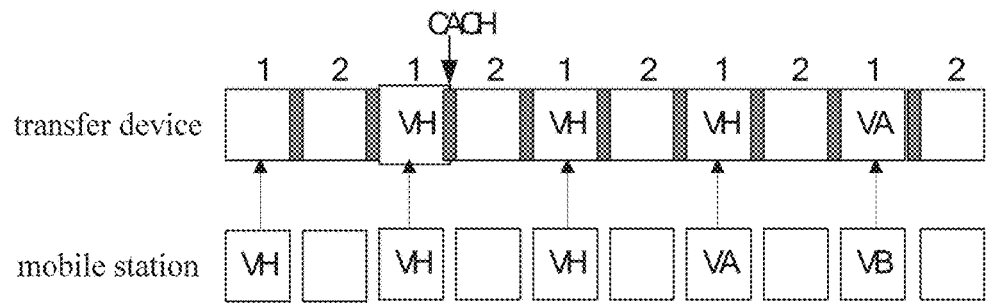
FIG. 1 is a signal flow graph of voice communications in the conventional technology.

To make those skilled in the art understand the technical solution better, the technical solutions according to embodiments of the disclosure will be described clearly and completely in conjunction with drawings hereinafter. Apparently, the described embodiments are just a few rather than all of the embodiments of the disclosure. All other embodiments obtained by those skilled in the art based on the embodiments of the disclosure without any creative work will fall within the protection scope of the disclosure.

For better understanding of the technical solutions of the disclosure, terminology to be used in the embodiments of the disclosure and a principle for establishing communications in a transfer mode in the conventional technology are described. For ease of description, terminologies of the disclosure hereinafter are in a form of abbreviations. Referring to Table 1, abbreviations and explanations of the terminologies to be used in the disclosure are shown, where MS (mobile station) is a mobile station.

TABLE 1

Abbreviations and explanations of the terminologies

| Abbreviation | Full name in English | Full name in Chinese | Description |
|---|---|---|---|
| DMR | Digital Mobile Radio | 数字移动无线电 | Digital interphone standard set by ETSI |
| PDT | Police Digital Trunking | 警用数字集群 | Digital trunking standard set by China |
| TDMA | Time Divide Multi Address | 时分多址 | |
| PDU | Protocol Data Unit | 协议信息单元 | An information unit including protocol control information and user data |
| MS | Mobile Station | 移动台 | |
| BS | Base Station | 中转设备 | |
| CACH | Common Announcement Channel | 公共广播信道 | Outbound announcement signalling of the transfer device to carry control information such as timeslot numbers |
| CSBK | Control Signalling Block | 控制信令块 | A Control Signalling format in DMR/PDT standards |
| A | Activation | 中转设备激活帧 | A PDU required to be transmitted when a mobile station activates a transfer device |
| Idle | Idle | 空闲帧 | Data frame transmitted when there is no data to be transferred after the transfer device is activated |
| FAC | Fast Activate CSBK | 快速激活控制帧 | A PDU required to be transmitted when a communication in transfer mode is established |
| FAEVH | Fast Activate Embedded Voice Header | 快速激活嵌入式语音头 | Control information embeddable in a voice super frame for transmission |
| VH | Voice Header | 语音头 | A PDU transmitted before an actual voice in a voice service |
| VA | Voice Frame A | 语音帧 A | A first voice frame of the voice super frame |
| VB | Voice Frame B | 语音帧 B | A second voice frame of the voice super frame |
| VC | Voice Frame C | 语音帧 C | A third voice frame of the voice super frame |
| VD | Voice Frame D | 语音帧 D | A fourth voice frame of the voice super frame |
| VE | Voice Frame E | 语音帧 E | A fifth voice frame of the voice super frame |
| VF | Voice Frame F | 语音帧 F | A sixth voice frame of the voice super frame |
| VSF | Voice Super Frame | 语音超帧 | A basic unit including 6 ordinary voice frames |
| PC | PreCSBK | 前导控制帧 | A PDU transmitted before actual data in a data service |
| DH | Data Header | 数据头 | A PDU transmitted before actual data in a data service |
| DB | Data Block | 数据块 | A PDU carrying actual user data in a data service |
| CBF | CSBK Blocks to follow | 后续控制信令块数 | A field in the PDU showing the number of CSBK blocks to follow |
| Inbound | Inbound | 上行 | A direction from the MS to the transfer device |
| Outbound | Outbound | 下行 | A direction from the transfer device to the MS |

Figure 2:
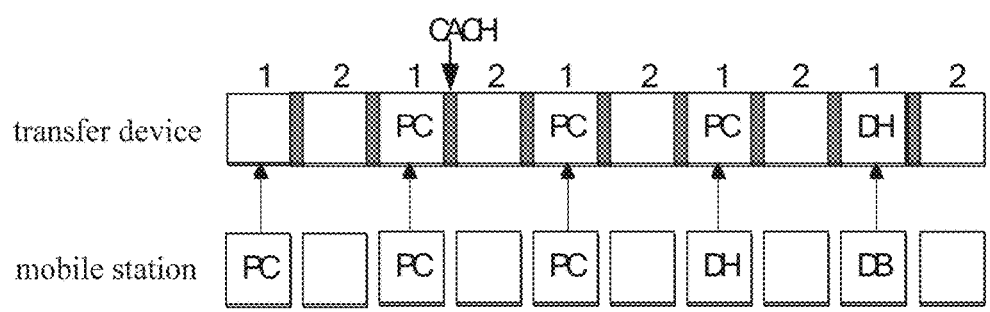
FIG. 2 is a signal flow graph of data communications in the conventional technology.
Figure 3:
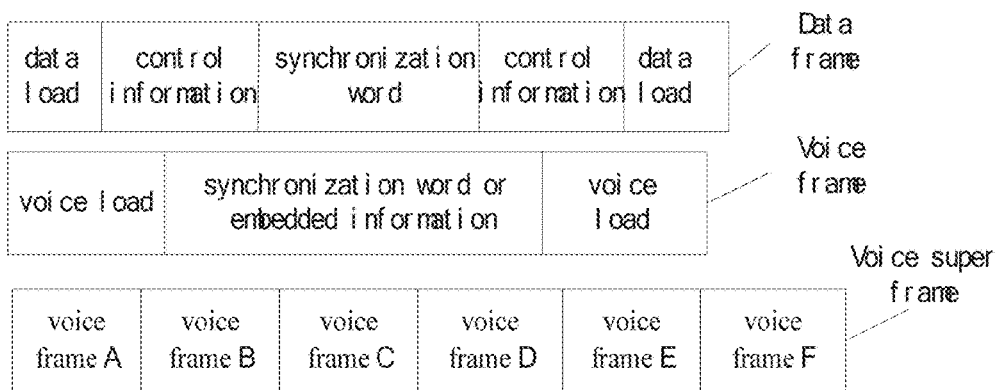
FIG. 3 is a schematic structural diagram of a data frame, a voice frame and VSF in the conventional technology.

Further, referring to FIG. 1 to FIG. 2, signal flow graphs of service communications in the conventional technology are shown. FIG. 1 corresponds to a signal flow graph of voice communications, FIG. 2 corresponds to a signal flow graph of data communications. The mobile station directly transmits control information. For a voice service, the mobile station transmits VH first, and for a data service, the mobile station transmits PC first. The transfer device establishes "synchronization" with the mobile station and transfers the control information directly. Since the transfer device cannot know the timeslot used by the mobile station, it is possible that the "synchronization" established herein is not correct, and there are communication errors. For the voice service, it should be noted that, a voice super frame VSF is used as a basic unit in a communication process defined by a DMR/PDT standard in actual transmitting, i.e., every 6 voice frames form a VSF, as shown in FIG. 3. Frame synchronization information is in the middle of a first voice frame A, to find a starting position of a VSF. Embedded signaling information (e.g., information where VH may be embedded) is in the middle of each of other 5 voice frames. For the voice, voice frame synchronization information is embedded in the middle of the first voice frame of each VSF. For the data, data frame synchronization information is embedded in the middle of each data frame.

Figure 4:
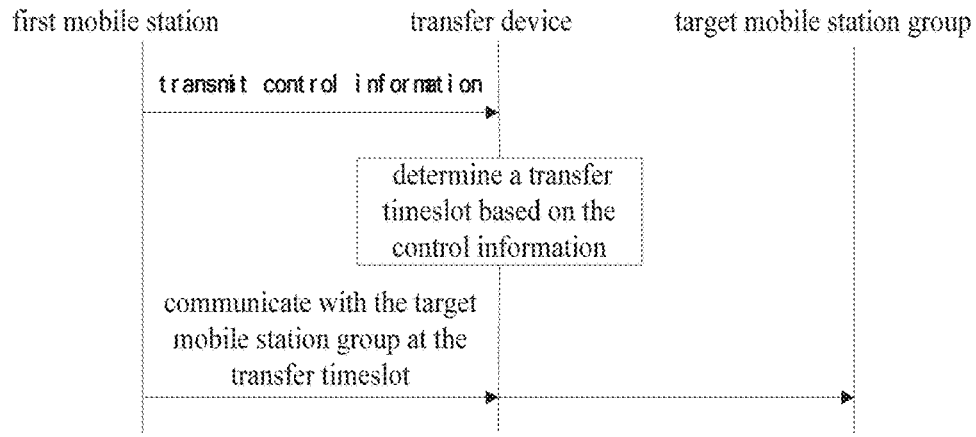
FIG. 4 is a flow chart of a method for communication establishment based on a transfer mode according to a first embodiment of the disclosure.

Based on the forgoing, FIG. 4 shows a flow chart of a method for communication establishment based on a transfer mode according to a first embodiment of the disclosure. The embodiment is described based on the DMR/PDT standard. The embodiment may include steps 401 to 402.

In step 401, a first mobile station transmits control information to a transfer device.

When the mobile station is in an idle state, and a user triggers a service of the first mobile station, the first mobile station generates the control information based on a type of the triggered service. The control information includes a timeslot used by the first mobile station and a control signaling corresponding to the type of the service. The transfer device receives the control information, determines a timeslot of the transfer device which is synchronous with the timeslot used by the first mobile station as a transfer timeslot, and get ready to communicate based on the control signaling. To illustrate the technical solution according to the embodiment, control information generated based on the DMR/PDT standard is described herein. In a case that the type of the service is a non-voice service, the control information is a fast activate control frame FAC generated based on a standard preamble control frame PC; and in a case that the type of the service is a voice service, the control information may be a fast activate control frame FAC generated based on a standard voice header VH. For different types of services, structures of information units of the FAC are similar, and only differ in content with which fields are filled. Referring to Table 2 and Table 3, structures of VH and PC defined in the DMR/PDT standard are shown.

TABLE 2

Structure of VH defined in the DMR/PDT standard

| Information Element | Length | Remark |
| --- | --- | --- |
| Message Dependent Elements | | |
| Protect Flag(PF) | 1 | This bit shall be set to $0_2$ |
| Reserved(R) | 1 | This bit shall be set to $0_2$ |
| Feature Elements | | |
| FLCO (Full-Link Control Code) | 6 | Shall be set to $000000_2$ |
| Feature Set ID(FID) | 8 | SFID |
| Service_Option | 8 | |
| Target Address | 24 | |
| Source Address | 24 | |

TABLE 3

Structure of PC defined in the DMR/PDT standard

| Information Element | Length | Remark |
| --- | --- | --- |
| Message Dependent Elements | | |
| Lask Block(LB) | 1 | This bit shall be set to $1_2$ |
| Protect Flag(PF) | 1 | This bit shall be set to $0_2$ |
| Feature Elements | | |
| CSBK Opcode(CSBKO) | 6 | Shall be set to $111101_2$ |
| Feature Set ID(FID) | 8 | SFID |
| Data/CSBK | 1 | $0_2$-CSBK $1_2$-Data |
| Individual/Group(IG) | 1 | $0_2$-Individual $1_2$-Group |
| Reserved(R) | 6 | These bits shall be set to $000000_2$ |
| CSBK Blocks to follow(CBF) | 8 | |
| Target Address | 24 | |
| Source Address | 24 | |

A case with 2 timeslots is taken as an example, structure of the FAC generated based on the structures defined in Table 2 and Table 3 is shown in Table 4.

TABLE 4

Structure of FAC

| Information Element | Length | Remark |
| --- | --- | --- |
| Message Dependent Elements | | |
| Lask Block(LB) | 1 | This bit shall be set to $1_2$ |
| Protect Flag(PF) | 1 | This bit shall be set to $0_2$ |
| Feature Elements | | |
| CSBK Opcode(CSBKO) | 6 | |
| Feature Set ID(FID) | 8 | |
| TDMA channel(TC) | 1 | $0_2$-Slot1 $1_2$-Slot2 |

TABLE 4-continued

Structure of FAC

| Information Element | Length | Remark |
| --- | --- | --- |
| (Timeslot Number) | | |
| IG (Individual/Group) | 1 | $0_2$-Individual $1_2$-Group |
| Service Type(ST) | 2 | $00_2$-CSBK content follows preambles |
| | | $01_2$-Data content follows preambles |
| | | $10_2$-Voice content follows LC header |
| | | $11_2$-Reserved |
| Encryption Type(ET) | 2 | $00_2$-No Encryption |
| | | $01_2$-Encryption Type1 |
| | | $10_2$-Encryption Type2 |
| | | $11_2$-Reserved |
| Reserved | 2 | These bits shall be set to $00_2$ |
| Service_Option/CBF | 8 | Follow VH or PC |
| Target Address | 24 | |
| Source Address | 24 | |

A field TC represents the timeslot used by the first mobile station, a field IG represents an individual call or a group call. Implementations of the solution are the same for the individual call or the group call, and only differ in information with which PDU is filled. A field ET represents an encryption method used, and subsequent service information to be transmitted varies depending on different encryption methods. Only unencrypted services are illustrated in this example, and encrypted services are processed similarly to the unencrypted services. A field ST represents a type of service required to be transferred subsequently. In a case that the ST is a voice service, a following field Service_Option/CBF needs to be filled with correct Service Option information, and in a case that the ST is a non-voice service (the non-voice service mainly includes a data service and some signaling services), the following field Service_Option/CBF needs to be filled with correct CBF information, and definitions of other parts are the same as the conventional standard.

In step 402, the first mobile station communicates with a target mobile station group at the transfer timeslot.

The TC in the FAC shows the timeslot number used by the first mobile station, the transfer device receives the FAC and analyzes the FAC to obtain a required transfer timeslot (to achieve timeslot synchronization). In a case that the target mobile station group includes only one mobile station, the service is an individual call, and in a case that the target mobile station group includes multiple mobile stations, the service is a group call. When the first mobile station communicates with the target mobile station group, the first mobile station transmits service information of a corresponding service type to the transfer device at a timeslot at which the FAC is transmitted, and then, the transfer device transfers the service information to a target mobile station group at the transfer timeslot, to achieve information transmission between the first mobile station and the target mobile station group.

Preferably, in a case that the service type is a non-voice service, after obtaining the transfer timeslot, the transfer device needs to transmits the FAC or the standard preamble control frame PC reconstructed based on the FAC to the target mobile station group, and the target mobile station group get ready for communications based on a non-voice service type and a control signaling corresponding to the non-voice service carried in the FAC or the PC; after that, the first mobile station transmits the non-voice service information to the transfer device at the timeslot at which the FAC is transmitted, and the transfer device transfers received non-voice service information to the target mobile station group at the transfer timeslot, to achieve non-voice service information transmission between the first mobile station and the target mobile station group.

In a case that the service type is a voice service, after obtaining the transfer timeslot, the transfer device needs to transmits the FAC or a standard voice header VH reconstructed based on the FAC to the target mobile station group, and the target mobile station group get ready for communications based on a voice service type and a control signaling corresponding to the voice service carried in the FAC or the VH. After that, the first mobile station transmits a voice super frame (carrying voice service information) to the transfer device at the timeslot at which the FAC is transmitted, and the transfer device transfers the received voice super frame to the target mobile station group at the transfer timeslot, to achieve voice service information transmission between the first mobile station and the target mobile station group.

Figure 5:
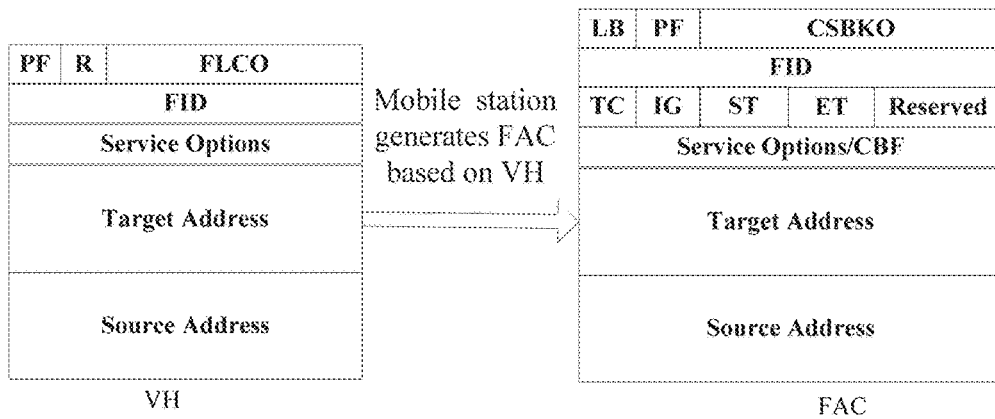
FIG. 5 is a schematic diagram of a process that a first mobile station generates FAC based on VH.
Figure 6:
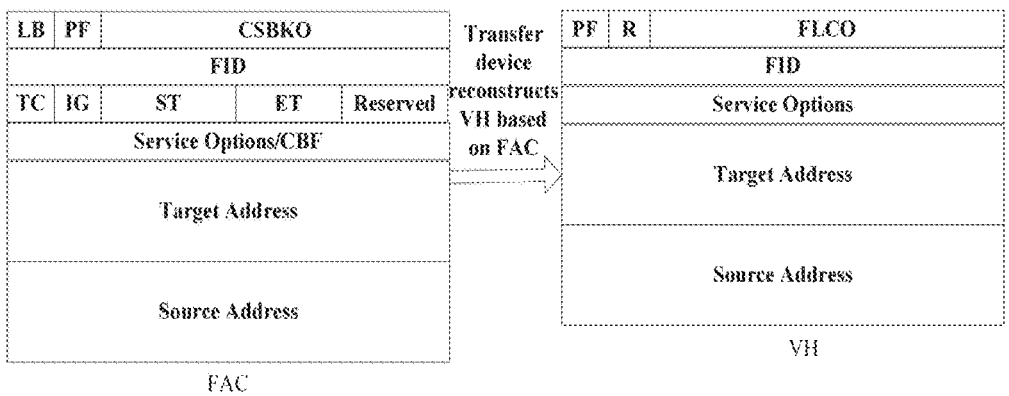
FIG. 6 is a schematic diagram of a process that a transfer device reconstructs VH based on FAC.
Figure 7:
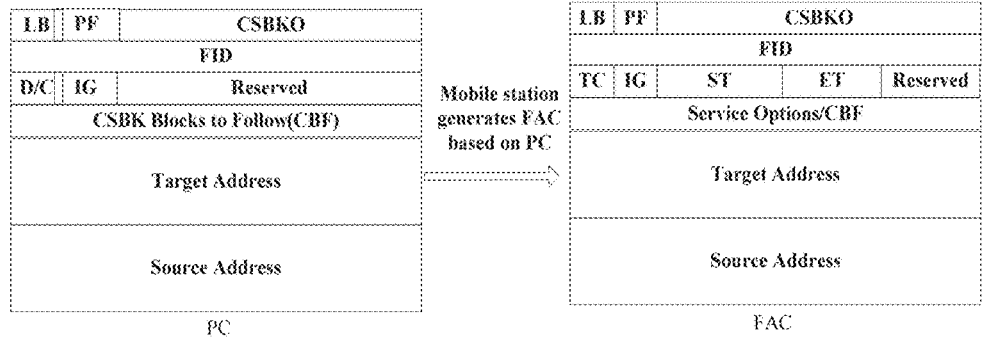
FIG. 7 is a schematic diagram of a process that the first mobile station generates FAC based on PC.
Figure 8:
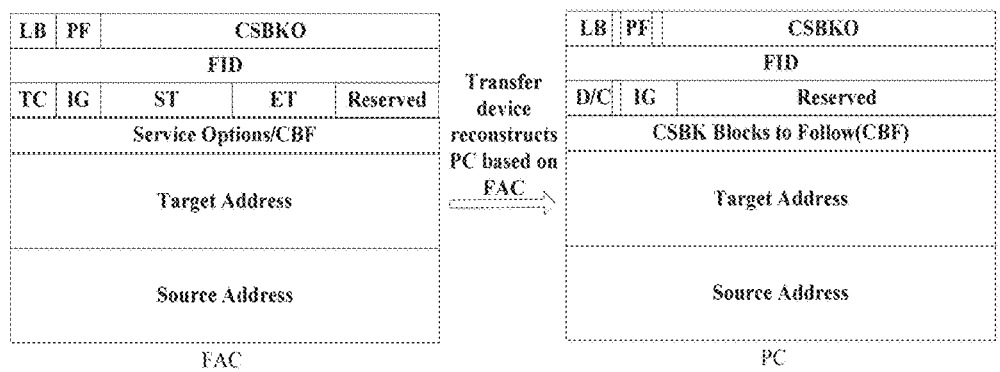
FIG. 8 is a schematic diagram of a process that the transfer device reconstructs PC based on FAC.

The VH or PC is reconstructed for compatibility with existing mobile stations. If the target mobile station group cannot identify the FAC, a communication link can only be successfully established based on the VH or PC rather than based on the FAC. Specifically, FIG. 5 and FIG. 6 show processes that the first mobile station generates the FAC based on the VH and the transfer device reconstructs the VH based on the FAC. FIG. 7 and FIG. 8 show processes that the first mobile station generates the FAC based on the PC and the transfer device reconstructs the PC based on the FAC.

In the technical solution according to the embodiment, when a service of the first mobile station is triggered, the first mobile station transmits the control information to the transfer device. The control information includes the timeslot used by the first mobile station and the control signaling corresponding to the service type. Since the control information includes the timeslot used by the first mobile station, the transfer device may determine a timeslot to be used after receiving the control information transmitted by the mobile station, and get ready for communication based on the control signaling in the control information. Subsequently, the first mobile station may communicate with the target mobile station group at the transfer timeslot. When the communications are established, the transfer device may exactly obtain information of the timeslot used by a communication initiator, to ensure that the transfer device may transfer at a correct transfer timeslot when the service begins, thereby achieving accurate communication between the mobile stations, and reducing an error rate.

Figure 9:
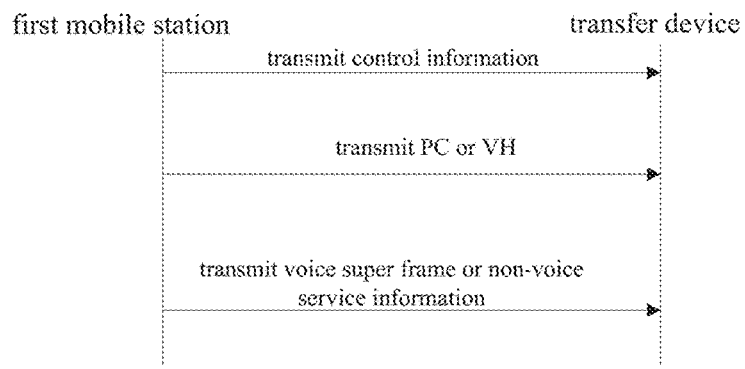
FIG. 9 is a flow chart of a method for communication establishment based on a transfer mode according to a second embodiment of the disclosure.

In the first embodiment, new control information i.e., the fast activate control frame FAC, is constructed based on the DMR/PDT standard. For compatibility with an existing transfer device, based on the first embodiment, a method for communication establishment based on the transfer mode according to a second embodiment is further provided. FIG. 9 is a flow chart of the method for communication establishment based on the transfer mode according to the second embodiment of the disclosure. For implementation of steps related to the first embodiment, steps in the embodiment mentioned above may be referred to, which is not repeated herein. The second embodiment includes steps 901 to 905.

In step 901, a first mobile station transmits control information to a transfer device.

For a non-voice service, the control information is an FAC generated based on a PC. For a voice service, the control information is an FAC generated based on a VH. After the transfer device receives the control information, the control information may be processed with reference to step 402, which is not repeated herein.

In step 902, for a non-voice service, the first mobile station transmits the PC to the transfer device at a transfer timeslot at which the FAC is transmitted.

In step 903, for a voice service, the first mobile station transmits the VH to the transfer device at the transfer timeslot at which the FAC is transmitted.

The objective of steps 902-903 is mainly to avoid a failure of communication link establishment when the transfer device does not receive the FAC or cannot identify the FAC. If the transfer device does not receive the information or cannot identify the FAC, it is required to transmit a standard control signaling PC or VH to the transfer device after transmitting the FAC to ensure the establishment of subsequent communications. In this case, even if the transfer device cannot transfer information to the target mobile station group due to inability to identify the FAC, the transfer device may transfer the information to the target mobile station group at a default timeslot after receiving the VH or PC, to achieve communication link establishment. On this occasion, the transfer device is still unable to know the timeslot used by the first mobile station, and a communication error may still occur.

After establishing communications with the target mobile station group, the first mobile station may execute the following steps, to transmit service information.

In step 904, for a non-voice service, the first mobile station transmits non-voice service information to the transfer device at a timeslot at which the FAC is transmitted.

The non-voice service information includes data information or signaling information. In this case, the transfer device determines a transfer timeslot based on the FAC, and transmits the non-voice service information to the target mobile station group at the transfer timeslot. If the transfer device does not receive the FAC or cannot identify the FAC, the process of establishing communications between the first mobile station and the target mobile station group is the same as the conventional technology, and the transfer device transfers the non-voice service information to the target mobile station group at a default timeslot.

In step 905, for a voice service, the first mobile station transmits a voice super frame to the transfer device at a timeslot at which the FAC is transmitted.

It should be noted that, for the voice service, there is an issue of lagging access, i.e., a communication interrupt occurs to the transfer device due to a temporary failure or a bad signal, the first mobile station is unable to know this case during transmitting and continues to transmit the signal, and the transfer device needs to continue to transfer the service information of the first mobile station after recovery. For a method for communication establishment where the mobile station transmits the control information to the transfer device, though the communications may be continued after the recovery of the transfer device, the transfer device is unable to correctly obtain the timeslot used by the first mobile station currently for a preceding FAC is missed, and a communication error may still occur.

To address the issue of lagging access, when the first mobile station communicates with the target mobile station group, only a VSF carrying a VH may be transmitted during transmitting of the VSF on an established communication link, in order to be compatible with existing transfer devices. But an error rate of communications cannot be reduced. Thus, preferably, a voice super frame VSF carrying a fast activate embedded voice header FAEVH generated based on the VH may be transmitted during subsequent transmitting of the VSF, wherein, the FAEVH carries information of the timeslot used by the first mobile station and a control signaling corresponding to the voice service. The transfer device may re-obtain a correct transfer timeslot in time based on the information of the timeslot used by the first mobile station in the FAEVH carried by the VSF after recovery, so as to establish a correct communication link.

Referring to FIG. 3, a structural diagram of a VSF is shown. A voice frame has 264 bits, the middle 48 bits are generally special information such as frame synchronization information or embedded information, and bits on both ends are voice payload information. Voice frames except voice frame A (carrying voice frame synchronization information) may each carry 48 bits of embedded information in the middle thereof, and the VH or FAEVH occupies more bits, may be divided into 4 parts and may be respectively filled into middle positions of 4 voice frames for carrying, thus a corresponding FAEVH may be worked out through receiving embedded information in the middle of 4 different voice frames.

Figure 10:
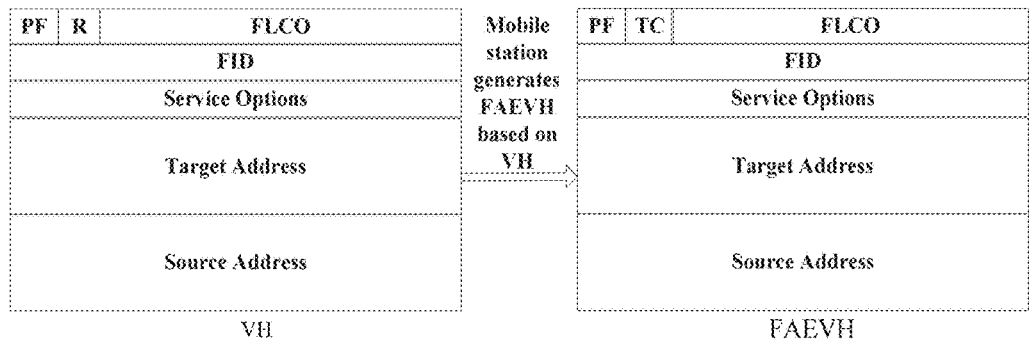
FIG. 10 is a schematic diagram of a process for generating FAEVH based on VH.

Taking account of compatibility of the transfer device, a VSF carrying a VH and a VSF carrying an FAEVH may be transmitted alternately in practice. Referring to Table 5, structure definition of the FAEVH is shown. A process that the mobile station generates the FAEVH based on the VH is shown in FIG. 10.

TABLE 5

Structure definition of FAEVH

| Information Element | Length | Remark |
|---|---|---|
| Message Dependent Elements | | |
| Protect Flag(PF) | 1 | This bit shall be set to $0_2$ |
| TDMA channel(TC) | 1 | $0_2$-Slot1 $1_2$-Slot2 |
| Feature Elements | | |
| FLCO | 6 | |
| Feature Set ID(FID) | 8 | |
| Service_Option | 8 | |
| Target Address | 24 | |
| Source Address | 24 | |

The technical solution according to this embodiment has beneficial effects of the first embodiment, and takes account of compatibility with existing transfer devices. Standard service signaling information may be transmitted to the transfer device after the transmitting of the FAC; in addition, the FAEVH is introduced for voice communications, so that correct communications may be restored in case of lagging access of the transfer device.

Figure 11:
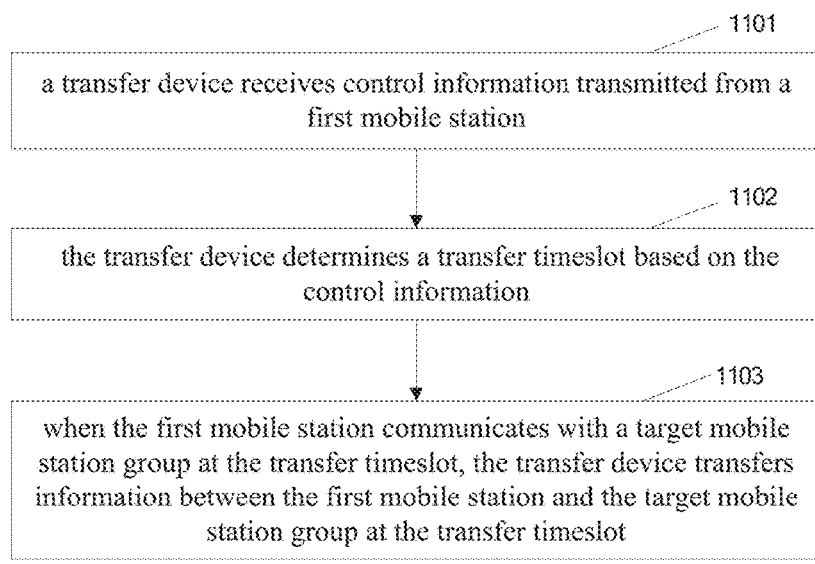
FIG. 11 is a flow chart of a method for communication establishment based on a transfer mode according to a third embodiment of the disclosure.

Based on the first and second embodiments, a method for communication establishment based on a transfer mode according to a third embodiment of the disclosure is provided. FIG. 11 is a flow chart of the method for communication establishment based on the transfer mode according to the third embodiment of the disclosure. For implementation of steps related to the first and second embodiments, steps in the embodiments mentioned above may be referred to, which are not repeated herein. The third embodiment may include steps 1101 to 1103.

In step 1101, a transfer device receives control information transmitted from a first mobile station.

In step 1102, the transfer device determines a transfer timeslot based on the control information, and gets ready for communications based on a control signaling.

The control information includes a timeslot used by the first mobile station and a control signaling corresponding to a service type. For a non-voice service, the control information is a fast activate control frame FAC generated based on a standard preamble control frame PC, and for a voice service, the control information is a fast activate control frame FAC generated based on a standard voice header VH.

In step 1103, when the first mobile station communicates with a target mobile station group at the transfer timeslot, the transfer device transfers information between the first mobile station and the target mobile station group at the transfer timeslot.

For implementation of steps related to this embodiment, description of relevant steps in the first embodiment may be referred to, and the technical solution according to this embodiment has the same beneficial effects as the first embodiment, which is not repeated herein.

Figure 12:
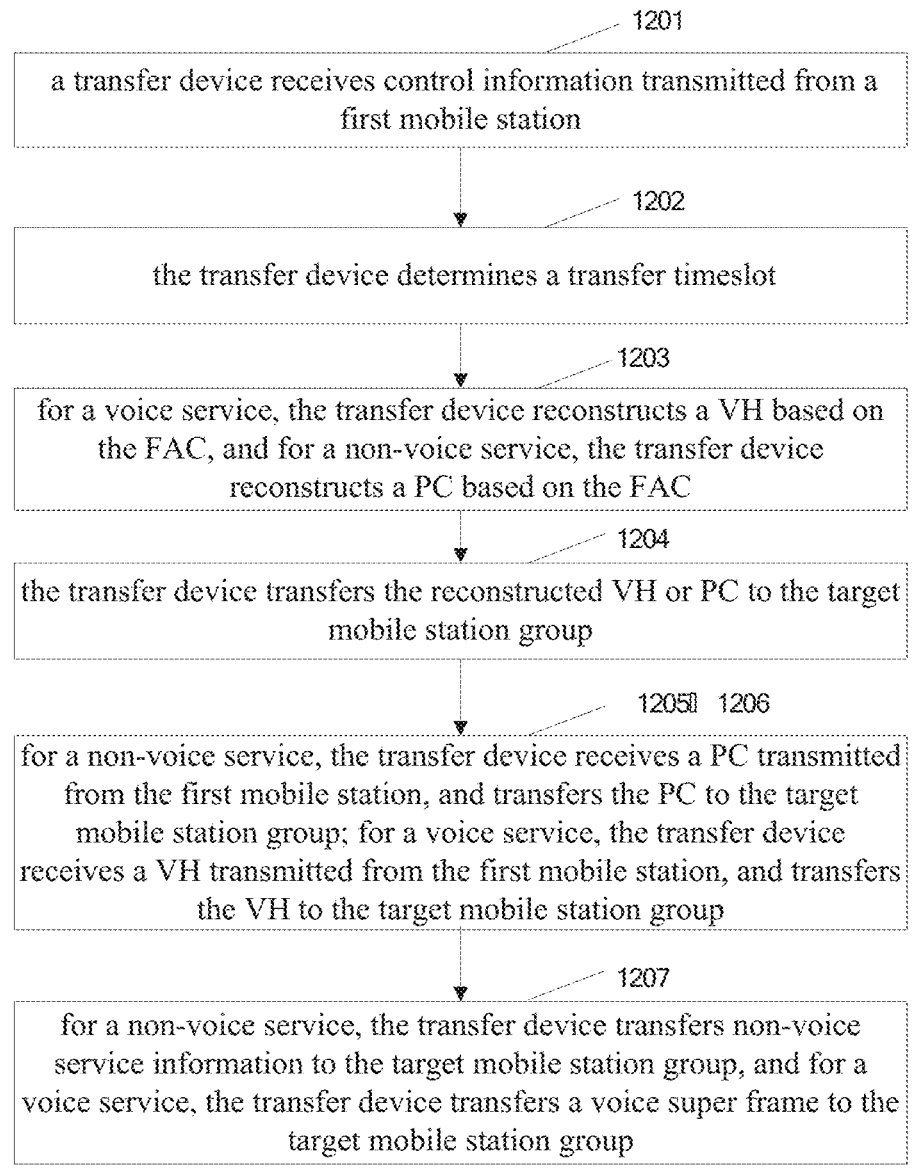
FIG. 12 is a flow chart of a method for communication establishment based on a transfer mode according to a fourth embodiment of the disclosure.

Based on the third embodiment, a method for communication establishment based on a transfer mode according to a fourth embodiment of the disclosure is provided, and the fourth embodiment may be regarded as an implementation based on the third embodiment. FIG. 12 is a flow chart of the method for communication establishment based on the transfer mode according to the fourth embodiment of the disclosure. For implementation of steps related to the third embodiment, steps in the embodiments mentioned above may be referred to, which are not repeated herein. The fourth embodiment may include steps 1201 to 1202.

In step 1201, a transfer device receives control information transmitted from a first mobile station.

The control information includes a timeslot used by the first mobile station and a control signaling corresponding to a service type.

In step 1202, the transfer device determines a transfer timeslot based on the control information, and gets ready for communications based on the control signaling.

In a case that the control information is an FAC, the transfer device may directly transfer the FAC to the target mobile station group at the transfer timeslot. For compatibility with an existing mobile station, the embodiment may further include the following preferable steps 1203 to 1204.

In step 1203, for a voice service, the transfer device reconstructs a VH based on the FAC, and for a non-voice service, the transfer device reconstructs a PC based on the FAC.

In step 1204, the transfer device transfers the reconstructed VH or PC to the target mobile station group.

To avoid a case that the transfer device is unable to identify the FAC and communications cannot be established, the first mobile station may further transmits a standard signaling information VH or PC to the transfer device after transmitting the FAC. The following preferable steps 1205 to 1206 may be referred to.

In step 1205, for a non-voice service, the transfer device receives the PC transmitted from the first mobile station, and transfers the PC to the target mobile station group.

In step 1206, for a voice service, the transfer device receives the VH transmitted from the first mobile station, and transfers the VH to the target mobile station group.

After determining a transfer timeslot, the transfer device transfers a received VH or PC to the target mobile station group at the transfer timeslot. If the transfer device does not receive the control information or cannot identify the control information, the transfer device transfers a received VH or PC to the target mobile station group at a default timeslot, and communications are established between the first mobile station and the target mobile station group through the VH or PC.

After a communication link is established between the first mobile station and the target mobile station group, the first mobile station transmits service information through the transfer device. Specifically, the following preferable step 1207 may be referred to.

In step 1207, for a non-voice service, the transfer device transfers non-voice service information to the target mobile station group, and for a voice service, the transfer device transfers a voice super frame to the target mobile station group.

The non-voice service information includes data information or signaling information, and the voice super frame carries service information. The voice super frame may further carry a VH or an FAEVH besides the service information, i.e., the voice super frame is a VSF carrying the VH and/or the FAEVH, and the FAEVH carries a timeslot information used by the first mobile station and a control signaling corresponding to the voice service.

Figure 13:
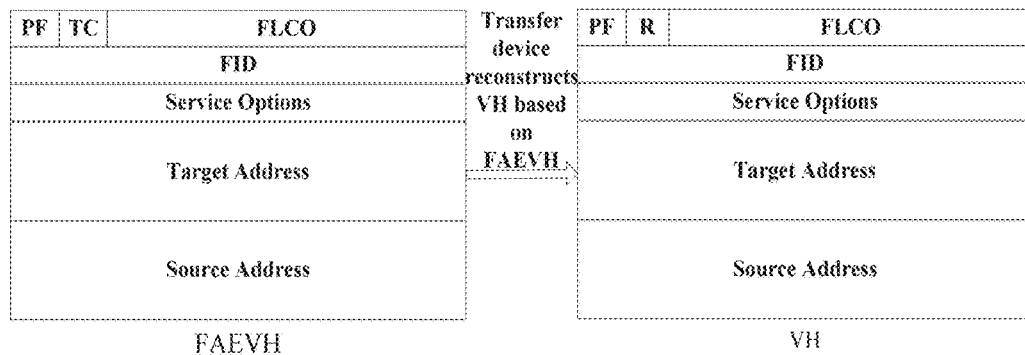
FIG. 13 is a schematic diagram of a process for reconstructing VH based on FAEVH.

For the non-voice service, there is no issue of lagging access. A voice may be received from the middle, while data cannot be correctly restored as long as it is missed, thus lagging access is completely meaningless for data communications, and the first mobile station only needs to directly transmit the signaling information or data information after communications are established between the first mobile station and the target mobile station group. For the voice service, to address the issue of lagging access, the first mobile station may transmit a VSF carrying the VH and/or the FAEVH when transmitting the VSF. The transfer device may directly transfer the received VSF. For compatibility with an existing mobile station, preferably, for the voice service, the transfer device may convert the FAEVH in the VSF into the VH, and then transfer a converted VSF carrying the VH to the target mobile station group. Specifically, a process that the transfer device reconstructs a VH based on an FAEVH is shown in FIG. 13.

The technical solution according to this embodiment may realize the beneficial effects of the third embodiment, and takes account of compatibility with existing transfer devices. The transfer device may reconstruct the VH or PC based on the FAC after receiving the FAC, and the FAEVH is introduced to reconstruct the VH based on the FAEVH, thereby providing compatibility with an existing mobile station, addressing the issue of lagging access of the transfer device, and reducing a communication error rate.

Figure 14:
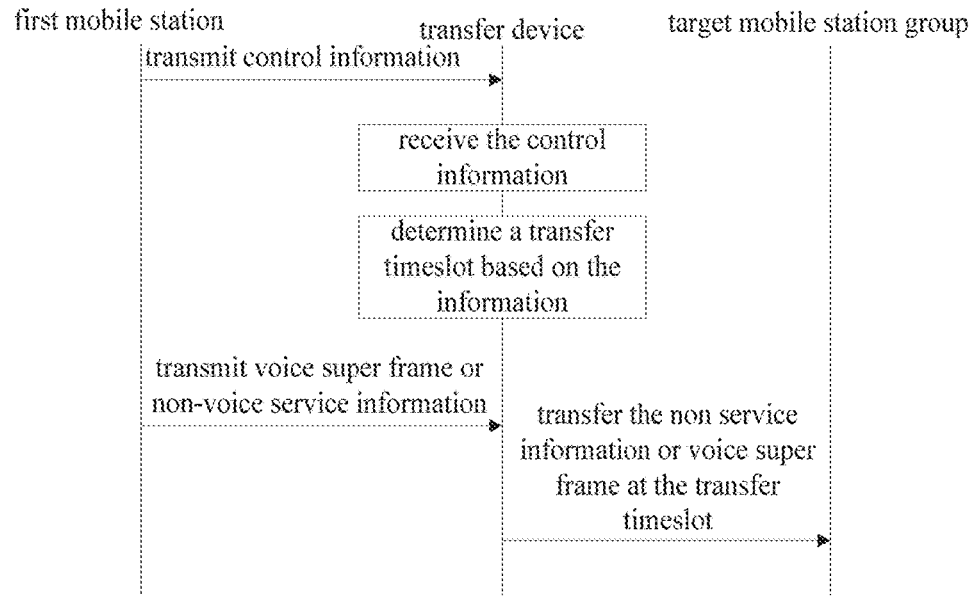
FIG. 14 is a flow chart of a method for communication establishment based on a transfer mode according to a fifth embodiment of the disclosure.

Referring to FIG. 14, a flow chart of a method for communication establishment based on a transfer mode according to a fifth embodiment of the disclosure is shown. This embodiment is a general flow chart of communication establishment based on a transfer device. For implementation of related steps, the embodiments mentioned above may be referred to, which is not repeated herein. The fifth embodiment may include steps 1401 to 1404.

In step 1401, a first mobile station transmits control information to a transfer device.

The control information includes a timeslot used by the first mobile station and a control signaling corresponding to a service type.

In step 1402, the transfer device receives a message carrying the control signaling transmitted from the first mobile station to the transfer device.

In step 1403, the transfer device determines a transfer timeslot based on the control information, and gets ready for communications based on the control signaling.

In step 1404, the first mobile station communicates with a target mobile station group at the transfer timeslot, and the transfer device transfers information between the first mobile station and the target mobile station group at the transfer timeslot.

Figure 15:
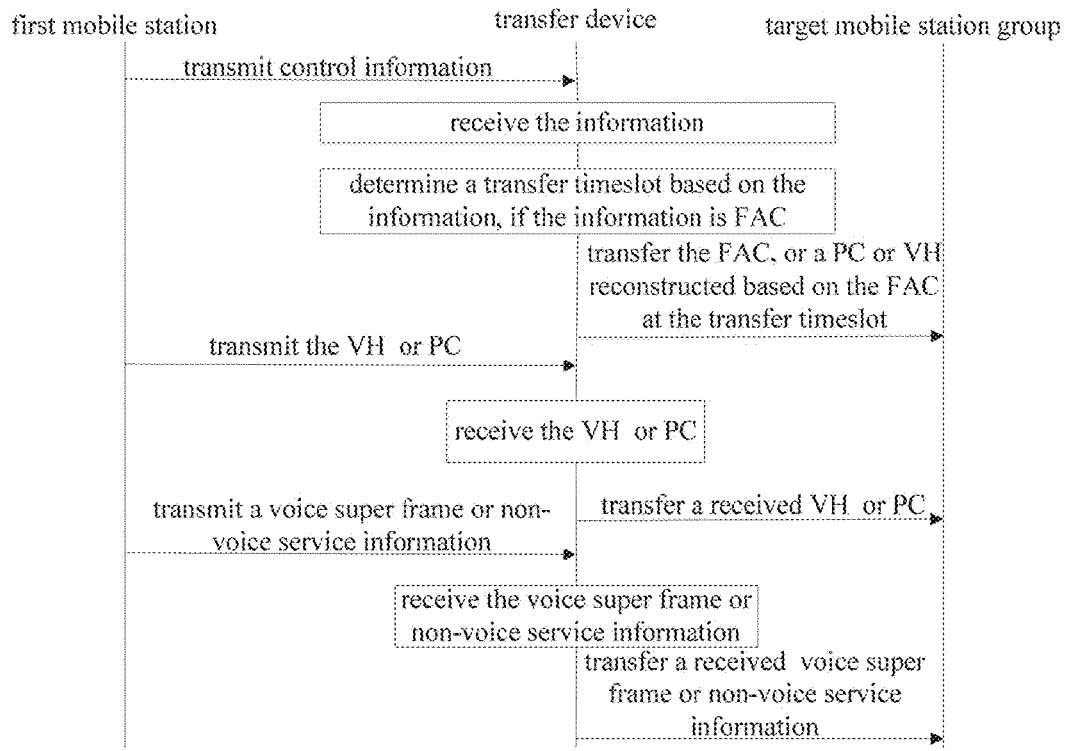
FIG. 15 is a flow chart of a method for communication establishment based on a transfer mode according to a sixth embodiment of the disclosure.

Referring to FIG. 15, a method for communication establishment based on a transfer mode according to a sixth embodiment of the disclosure is provided. This embodiment may be regarded as an implementation based on the fifth embodiment. For implementation of related steps, the embodiments mentioned above may be referred to, which is not repeated herein. This embodiment may include steps 1501 to 1504.

In step 1501, a first mobile station transmits control information to a transfer device.

In step 1502, the transfer device receives control information transmitted from the first mobile station.

The following steps are illustrated with an FAC as an example.

In step 1503, the transfer device determines a transfer timeslot based on the FAC, and gets ready for communications based on a control signaling carried in the FAC.

In step 1504, the transfer device transfers the FAC or a VH or a PC reconstructed based on a service type carried in the FAC to a target mobile station group at the transfer timeslot.

For compatibility with an existing transfer device, the embodiment may further include steps 1505 to 1510.

In step 1505, the first mobile station transmits the VH or PC to the transfer device at a timeslot at which the FAC is transmitted.

For a voice service, the first mobile station transmits the VH to the transfer device at the timeslot at which the FAC is transmitted; and for a non-voice service, the first mobile station transmits the PC to the transfer device at the timeslot at which the FAC is transmitted.

In step 1506, the transfer device receives the VH or PC transmitted from the first mobile station.

In step 1507, the transfer device transfers the received VH or PC to a target mobile station group.

In step 1508, for a non-voice service, the first mobile station transmits non-voice service information to the transfer device at the timeslot at which the FAC is transmitted.

The non-voice service information includes data information or signaling information.

In step 1509, for a voice service, the first mobile station transmits a voice super frame to the transfer device at the timeslot at which the FAC is transmitted.

The voice super frame is a VSF carrying a VH and/or an FAEVH, and the voice super frame carries voice service information.

In step 1510, the transfer device transfers the non-voice service information or the voice super frame to the target mobile station group.

In a case that the voice super frame is a VSF carrying an FAEVH, the FAEVH may be converted into a VH and transferred to the target mobile station group, for compatibility with an existing transfer device. With regard to details, related steps in the embodiments mentioned above may be referred to, which are not repeated herein.

It should be noted that, in the embodiments mentioned above, information received by the transfer device are transferred at the transfer timeslot in a case that the transfer device determines the transfer timeslot. In a case that the transfer device does not determine the transfer timeslot, the transfer device transfers information at a default timeslot, and in this case, for communications between the first mobile station and the target mobile station group, implementations in the conventional technology may be referred to, which are not repeated herein.

In the embodiments mentioned above, the FAC is taken as an example for description for a voice service. In practical operation, the control information which the first mobile station transmits to the transfer device may be the FAEVH, and in this case, the FAEVH carrying timeslot information and a service control signaling is embedded in the VSF for transmission. The VSF includes an FAEVH carrying information which may indicate the timeslot used by the first mobile station, and further includes the voice service information. The transfer device extracts information about the timeslot used by the first mobile station after receiving a VSF with an FAEVH embedded, and determines the transfer timeslot, thereby ensuring a correct communication link established between the first mobile station and the target mobile station group after the transfer device receives the VSF carrying the FAEVH. For compatibility with an existing mobile station, the transfer device may convert the FAEVH carried in the VSF to a VH, and transmit a VSF carrying the VH to the target mobile station group. Unlike the lagging access in the second embodiment, if a failure occurs in a base station and causes communication interrupt after correct communications are established, the VSF with the FAEVH embedded is adopted to address the issue of lagging access and achieve correct communications. Control information which the first mobile station transmits to the transfer device may be the FAEVH, in other words, communications established before the first mobile station transmits the voice super frame for the first time is implemented based on the conventional technology and cannot achieve a correct communication establishment, and the FAEVH is embedded in the voice super frame when the voice super frame including the voice service information is transmitted, so that the base station may identify a correct transfer timeslot, thereby achieving a subsequent correct communication link.

Figure 16:
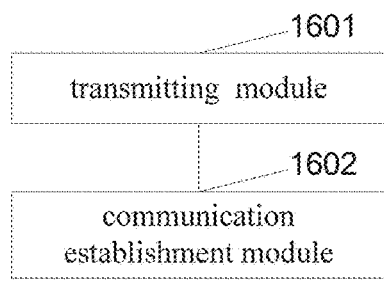
FIG. 16 is a schematic structural diagram of a mobile station according to an embodiment of the disclosure.

Corresponding to the method embodiments, a mobile station is proved accordingly. Referring to FIG. 16, a schematic structural diagram of a mobile station in the disclosure is shown. The mobile station includes a transmitting module 1601 and a communication establishment module 1602.

The transmitting module 1601 is configured to transmit control information to a transfer device. The control information includes a timeslot used by the first mobile station and a control signaling corresponding to a service type, so that the transfer device determines a transfer timeslot and gets ready for communications based on the control signaling. The transfer timeslot is a timeslot of the transfer device which is synchronous with the timeslot used by the first mobile station.

The communication establishment module 1602 is configured to communicate with a target mobile station group at the transfer timeslot. The target mobile station group includes at least one mobile station.

Preferably, in a case that a service type is a non-voice service, the control information is a fast activate control frame generated based on a standard preamble control frame. The communication establishment module 1602 is specifically configured to:

transmit non-voice service information to the transfer device at a timeslot at which the fast activate control frame is transmitted, so that the transfer device transfers the received non-voice service information to the target mobile station group at the transfer timeslot, after the transfer device transmits the fast activate control frame or a standard preamble control frame reconstructed based on the fast activate control frame to the target mobile station group, and the target mobile station group gets ready for communications based on a non-voice service type and a control signaling corresponding to the non-voice service carried in the fast activate control frame or the standard preamble control frame.

Or, in a case that the service type is a voice service, and the control information is a fast activate control frame generated based on a standard voice header, the communication establishment module 1602 is specifically configured to:

transmit a voice super frame to the transfer device at a timeslot at which the fast activate control frame is transmitted, so that the transfer device transfers a received voice super frame to the target mobile station group at the transfer timeslot, after the transfer device transmits the fast activate control frame or a standard voice header reconstructed based on the fast activate control frame to the target mobile station group, and the target mobile station group gets ready for communications based on a voice service type and a control signaling corresponding to the voice service carried in the fast activate control frame or the standard voice header.

Or, in a case that the service type is a voice service, and the control information is a fast activate embedded voice header generated based on a standard voice header, the control information is embedded in a voice super frame and transmitted to the transfer device, and the communication establishment module 1602 is specifically configured to:

sequentially transmits a voice super frame to the transfer device at a timeslot at which the voice super frame is transmitted, so that the transfer device transfers a received voice super frame to the target mobile station group at the transfer timeslot, after the transfer device transmits the voice super frame with the fast activate embedded voice header embedded to the target mobile station group, and the target mobile station group gets ready for communications based on a voice service control signaling carried in the fast activate embedded voice header of the voice super frame, or, the transfer device reconstructs a standard voice header base on the fast activate embedded voice header of the voice super frame and transmits the voice super frame with the standard voice header embedded to the target mobile station group, and the target mobile station group gets ready for communications based on a voice service control signaling carried in the standard voice header of the voice super frame.

Preferably, the transmitting module 1601 is further configured to transmit a voice super frame carrying a standard voice header and/or a voice super frame carrying a fast activate embedded voice header generated based on the standard voice header to the transfer device after the target mobile station group gets ready for communications.

Preferably, the transmitting module 1601 is further configured to, for a non-voice service, transmit a PC to the transfer device at a timeslot at which the control information is transmitted, and for a voice service, transmit a VH to the transfer device at the timeslot at which the control information is transmitted, so that the transfer device determines a transfer timeslot based on the control information, and transfers a received VH or PC to the target mobile station group at the transfer timeslot. In a case that the transfer device does not receive the control information or cannot identify the control information, the transfer device transfers the received VH or PC to the target mobile station group at a default timeslot of the transfer device.

Figure 17:
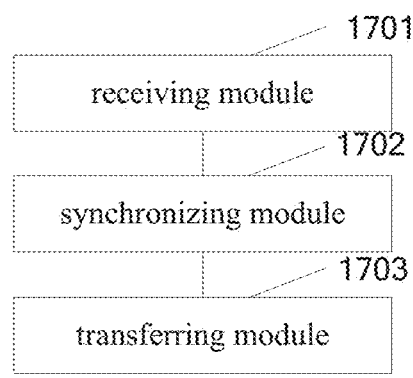
FIG. 17 is a schematic structural diagram of a transfer device according to an embodiment of the disclosure.

Referring to FIG. 17, a schematic structural diagram of a transfer device according to an embodiment of the disclosure is shown. The transfer device may include a receiving module 1701, a synchronizing module 1702 and a transferring module 1703.

The receiving module 1701 is configured to receive control information transmitted from a first mobile station. The control information includes a timeslot used by the first mobile station and a control signaling corresponding to a service type.

The synchronizing module 1702 is configured to determine a transfer timeslot based on the control information and gets ready for communications based on the control signaling. The transfer timeslot is a timeslot of the transfer device which is synchronous with the timeslot used by the first mobile station.

The transferring module 1703 is configured for the first mobile station to communicate with a target mobile station group at the transfer timeslot, for information transfer between the first mobile station and the target mobile station group at the transfer timeslot. The target mobile station group includes at least one mobile station.

Preferably, for a non-voice service, the control information is a fast activate control frame generated based on a standard preamble control frame. The transferring module 1703 may include a first transmitting sub module, a receiving sub module, and a second transmitting sub module.

The first transmitting sub module is configured to transmit a fast activate control frame or a standard preamble control frame reconstructed based on the fast activate control frame to the target mobile station group, so that the target mobile station group gets ready for communications based on a non-voice service type and a control signaling corresponding to the non-voice service carried in the fast activate control frame or the standard preamble control frame.

The receiving sub module is configured to receive non-voice service information transmitted by the first mobile station at a timeslot at which the fast activate control frame is transmitted.

The second transmitting sub module is configured to transfer the received non-voice service information to the target mobile station group at the transfer timeslot.

Or, in a case that the service type is a voice service, and the control information is a fast activate embedded voice header generated based on a standard voice header, the control information is embedded in a voice super frame and transmitted to the transfer device. The transferring module 1703 may include a third transmitting sub module, a second receiving sub module, and a fourth transmitting sub module.

The third transmitting sub module is configured to transmit a voice super frame with a fast activate embedded voice header embedded to the target mobile station group, so that the target mobile station group gets ready for communications based on a voice service control signaling carried in the fast activate embedded voice header of the voice super frame, or, reconstruct a standard voice header based on the fast activate embedded voice header of a voice super frame, and transmit a voice super frame with the standard voice header embedded to the target mobile station group, so that the target mobile station group gets ready for communications based on a voice service control signaling carried in the standard voice header of the voice super frame.

The second receiving sub module is configured to receive a voice super frame sequentially transmitted by the first mobile station to the transfer device at a timeslot at which the voice super frame is transmitted.

The fourth transmitting sub module is configured to transfer a received voice super frame to the target mobile station group at the transfer timeslot.

Or, in a case that the service type is the voice service, and the control information is a fast activate control frame generated based on a standard voice header, the transferring module 1703 may include a fifth transmitting sub module, a third receiving sub module, and a sixth transmitting sub module.

The fifth transmitting sub module is configured to transmit the fast activate control frame or a standard voice header reconstructed based on the fast activate control frame to the target mobile station group, so that the target mobile station group gets ready for communications based on a voice service type and a control signaling corresponding to the voice service carried in the fast activate control frame or the standard voice header.

The third receiving sub module is configured to receive voice service information transmitted by the first mobile station at a timeslot at which the FAC is transmitted.

The sixth transmitting sub module is configured to transfer the received voice service information to the target mobile station group at the transfer timeslot.

Preferably, the receiving module is configured to, after the target mobile station group gets ready for communications, receive a voice super frame carrying the standard voice header and/or a voice super frame carrying the fast activate embedded voice header generated based on the standard voice header, which are transmitted by the first mobile station to the transfer device. In a case that the voice super frame is a voice super frame carrying the fast activate embedded voice header, the transferring module 1703 is specifically configured to reconstruct a standard voice header based on the fast activate embedded voice header carried in the voice super frame, and transfer a voice super frame carrying a reconstructed standard voice header to the target mobile station group.

Preferably, the receiving module 1701 is further configured to, for a non-voice service, receive a PC transmitted by the first mobile station at a timeslot at which the control information is transmitted, and for a voice service, receive a VH transmitted by the first mobile station at the timeslot at which the control information is transmitted. The transferring module is specifically configured to, after the synchronizing module determines the transfer timeslot based on the information, transfer the received VH or PC to the target mobile station group at the transfer timeslot, and in a case that the receiving module 1701 does not receive the control information or cannot identify the control information, transfer the received VH or PC to the target mobile station group at a default timeslot of the transfer device.

Accordingly, a communication establishment system based on a transfer mode is provided according to an embodiment of the disclosure. The system includes at least two mobile stations according to any of the embodiments mentioned above and transfer devices according to any of the embodiments mentioned above.

Functions implemented through the modules of the devices correspond to steps of the methods according to the method embodiments, which are not repeated herein.

Furthermore, hardware structures of a mobile station entity and a transfer device entity are provided respectively according to the embodiments of the disclosure. The hardware may include at least one processor (such as a CPU), at least one network interface or other communication interfaces, storage, and at least one communication bus, to implement direct connection and communications for these devices. The processor is configured to execute an executable module stored in the storage such as computer programs. The storage may include high-speed random access memory (RAM: Random Access Memory), and may further include non-volatile memory, such as at least one disk storage. Communication connection between the system gateway and at least one other network element may be implemented through at least one network interface, which may be wired or wireless, such as internet, wide area network, local network, metropolitan area network, and private network.

In practical implementations, the storage of the mobile station entity stores program instructions, and the processor thereof may execute the following steps based on the program instructions:

transmitting control information to a transfer device, where the control information includes a timeslot used by a first mobile station and a control signaling corresponding to a service type, so that the transfer device determines a transfer timeslot and gets ready for communications based on the control signaling, and the transfer timeslot is a timeslot of the transfer device which is synchronous with the timeslot used by the first mobile station; and communicating with a target mobile station group at the transfer timeslot, where the target mobile station group includes at least one mobile station.

Accordingly, the storage of the transfer device entity also stores program instructions, and the processor thereof may execute the following steps based on the program instructions stored in the storage:

receiving control information transmitted by a first mobile station, where the control information includes a timeslot used by the first mobile station and a control signaling corresponding to a service type;

determining a transfer timeslot based on the control information, and getting ready for communications based on the control signaling, where the transfer timeslot is a timeslot of the transfer device which is synchronous with the timeslot used by the first mobile station; and transferring the information between the first mobile station and a target mobile station group at the transfer timeslot when the first mobile station communicates with the target mobile station group at the transfer timeslot, where the target mobile station group includes at least one mobile station.

It should be noted that, in the technical solutions according to the embodiments of the disclosure, a transfer timeslot required for the mobile station may be indicated through other methods, or through a custom control frame based on an actually used communication protocol. For an implementation principle, implementations of the embodiments of the disclosure may be referred to, which are not repeated herein. The system embodiment basically corresponds to the method embodiment, thus for related parts thereof, description of the method embodiment may be referred to. The described system embodiment is merely exemplary, the units described as separate components may be or may be not separated physically, and the components shown as units may be or may not be physical units, i.e., the units may be located at one place or may be distributed onto multiple network units. All of or part of the units may be selected based on actual needs to implement the objectives of the solutions according to the embodiments of the disclosure. Those skilled in the art may understand and implement the solutions without creative effort.

The described embodiments are just preferable embodiments of the disclosure. It should be noted that, various changes and modifications may be made by those skilled in the art without departing from a principle of the disclosure, and the modifications and polish should be regarded as the protection scope of the disclosure.

The invention claimed is:

1. A method for communication establishment based on a transfer mode, comprising:

transmitting, by a first mobile station, control information to a transfer device, wherein the control information comprises a timeslot used by the first mobile station and a control signaling corresponding to a service type, so that the transfer device determines a transfer timeslot and gets ready for communications based on the control signaling, and the transfer timeslot is a timeslot of the transfer device which is synchronous with a timeslot used by the first mobile station; and communicating, by the first mobile station, with a target mobile station group at the transfer timeslot, wherein the target mobile station group comprises at least one mobile station, wherein:

in a case that a service type is a non-voice service, and the control information is a fast activate control frame generated based on a standard preamble control frame, the communicating, by the first mobile station, with the target mobile station group at the transfer timeslot, comprises: transmitting, by the first mobile station, non-voice service information to the transfer device at a timeslot at which the fast activate control frame is transmitted, so that the transfer device transfers received non-voice service information to the target mobile station group at the transfer timeslot, after the transfer device transmits the fast activate control frame or a standard preamble control frame reconstructed based on the fast activate control frame to the target mobile station group, and the target mobile station group gets ready for communications based on a non-voice service type and a control signaling corresponding to the non-voice service carried in the fast activate control frame or the standard preamble control frame; or in a case that a service type is a voice service, the control information is a fast activate embedded voice header generated based on a standard voice header, and the control information is embedded in a voice super frame and transmitted to the transfer device, the communicating, by the first mobile station, with the target mobile station group at the transfer timeslot, comprises: transmitting, by the first mobile station, the voice super frame to the transfer device at a timeslot at which the voice super frame is transmitted sequentially, so that the transfer device transfers a received voice super frame to the target mobile station group at the transfer timeslot, after the transfer device transmits a voice super frame with the fast activate embedded voice header embedded to the target mobile station group, and the target mobile station group gets ready for communications based on a voice service control signaling carried in the fast activate embedded voice header of the voice super frame, or, after the transfer device reconstructs a standard voice header based on the fast activate embedded voice header of a voice super frame, and transmits the voice super frame with the standard voice header embedded to the target mobile station group, and the target mobile station group gets ready for communications based on a voice service control signaling carried in the standard voice header of the voice super frame; or in a case that a service type is a voice service, the control information is a fast activate control frame generated based on a standard voice header, the communicating, by the first mobile station, with the target mobile station group at the transfer timeslot, comprises: transmitting, by the first mobile station, a voice super frame to the transfer device at a timeslot at which the fast activate control frame is transmitted, so that the transfer device transfers a received voice super frame to the target mobile station group at the transfer timeslot, after the transfer device transmits the fast activate control frame or a standard voice header reconstructed based on the fast activate control frame to the target mobile station group, and the target mobile station group gets ready for communications based on a voice service type and a control signaling corresponding to the voice service carried in the fast activate control frame or the standard voice header.

2. The method according to claim 1, wherein in a case that the service type is a voice service, after the target mobile station group gets ready for communications, the voice super frame transmitted by the first mobile station to the transfer device is a voice super frame carrying the standard voice header and/or a voice super frame carrying the fast activate embedded voice header generated based on the standard voice header, and in a case that the voice super frame is a voice super frame carrying the fast activate embedded voice header, the method further comprises:
reconstructing, by the transfer device, a standard voice header based on a fast activate embedded voice header carried in the voice super frame, and transferring a voice super frame carrying a reconstructed standard voice header to the target mobile station group.

3. The method according to claim 1, wherein after the first mobile station transmits the control information to the transfer device, the method further comprises:
transmitting, for a non-voice service, by the first mobile station, a standard preamble control frame to the transfer device at a timeslot at which the control information is transmitted; and transmitting, for a voice service, by the first mobile station, a standard voice header to the transfer device at the timeslot at which the control information is transmitted; and
transferring, by the transfer device, a received standard voice header or a received standard preamble control frame to the target mobile station group at the transfer timeslot after the transfer device determines the transfer timeslot based on the control information; in a case that the transfer device does not receive the control information or cannot identify the control information, transferring, by the transfer device, the received standard voice header or the received standard preamble control frame to the target mobile station group at a default timeslot of the transfer device.

4. A mobile station, comprising a processor, and a memory storing program instructions, when executed, which cause the processor to:
transmit control information to a transfer device, wherein the control information comprises a timeslot used by a first mobile station and a control signaling corresponding to a service type, so that the transfer device determines a transfer timeslot and gets ready for communications based on the control signaling, wherein the transfer timeslot is a timeslot of the transfer device which is synchronous with the timeslot used by the first mobile station; and
communicate with a target mobile station group at the transfer timeslot, wherein the target mobile station group comprises at least one mobile station, wherein the processor is further configured to:
in a case that the service type is a non-voice service and the control information is a fast activate control frame generated based on a standard preamble control frame, and after the transfer device transmits the fast activate control frame or a standard preamble control frame reconstructed based on the fast activate control frame to the target mobile station group, and the target mobile station group gets ready for communications based on a non-voice service type and a control signaling corresponding to the non-voice service carried in the fast activate control frame or the standard preamble control frame, transmit non-voice service information to the transfer device at a timeslot at which the fast activate control frame is transmitted, so that the transfer device transfers received non-voice service information to the target mobile station group at the transfer timeslot; or,
in a case that the service type is a voice service and the control information is a fast activate control frame generated based on a standard voice header, and after the transfer device transmits the fast activate control frame or a standard voice header reconstructed based on the fast activate control frame to the target mobile station group, and the target mobile station group gets ready for communications based on a voice service type and a control signaling corresponding to the voice service carried in the fast activate control frame or the standard voice header, transmit a voice super frame to the transfer device at a timeslot at which the fast activate control frame is transmitted, so that the transfer device transfers a received voice super frame to the target mobile station group at the transfer timeslot; or
in a case that the service type is a voice service and the control information is a fast activate embedded voice header generated based on a standard voice header, and after the control information is embedded in the voice super frame and transmitted to the transfer device, the transfer device transmits the voice super frame with the fast activate embedded voice header embedded to the target mobile station group, and the target mobile station group gets ready for communications based on a voice service control signaling carried in the fast activate embedded voice header of the voice super frame, or, after the transfer device reconstructs a standard voice header based on the fast activate embedded voice header of a voice super frame and transmits a voice super frame with a standard voice header embedded to the target mobile station group, and the target mobile station group gets ready for communications based on a voice service control signaling carried in the standard voice header of the voice super frame, sequentially transmit a voice super frame to the transfer device at the timeslot at which the voice super frame is transmitted, so that the transfer device transfers a received voice super frame to the target mobile station group at the transfer timeslot.

5. A method for communication establishment based on a transfer mode, comprising:
receiving, by a transfer device, control information transmitted from a first mobile station, wherein the control information comprises a timeslot used by the first mobile station and a control signaling corresponding to a service type;
determining, by the transfer device, a transfer timeslot based on the control information, and getting ready for communications based on a control signaling, wherein, the transfer timeslot is a timeslot of the transfer device which is synchronous with a timeslot used by the first mobile station; and transferring, by the transfer device, information between the first mobile station and a target mobile station group at the transfer timeslot when the first mobile station communicates with the target mobile station group at the transfer timeslot, wherein the target mobile station group comprises at least one mobile station, wherein in a case that the service type is a non-voice service and the control information is a fast activate control frame generated based on a standard preamble control frame, the transferring, by the transfer device, information between the first mobile station and the target mobile station group at the transfer timeslot, comprises: transmitting, by the transfer device, the fast activate control frame or the standard preamble control frame reconstructed based on the fast activate control frame to the target mobile station group, so that the target mobile station group gets ready for communications based on a non-voice service type and a control signaling corresponding to the non-voice service carried in the fast activate control frame or the standard preamble control frame; receiving, by the transfer device, non-voice service information transmitted by the first mobile station at a timeslot at which the fast activate control frame is transmitted; and transferring, by the transfer device, received non-voice service information to the target mobile station group at the transfer timeslot; or in a case that the service type is a voice service, the control information is a fast activate embedded voice header generated based on a standard voice header, and the control information is embedded in a voice super frame and transmitted to the transfer device, the transferring, by the transfer device, information between the first mobile station and a target mobile station group at the transfer timeslot, comprises: transmitting, by the transfer device, a voice super frame with the fast activate embedded voice header embedded to the target mobile station group, so that the target mobile station group gets ready for communications based on a voice service control signaling carried in the fast activate embedded voice header of the voice super frame, or, reconstructing, by the transfer device, a standard voice header based on the fast activate embedded voice header of a voice super frame, and transmitting, by the transfer device, a voice super frame with a standard voice header embedded to the target mobile station group, so that the target mobile station group gets ready for communications based on a voice service control signaling carried in the standard voice header of the voice super frame; receiving, by the transfer device, the voice super frame transmitted by the first mobile station at a timeslot at which the voice super frame is transmitted to the transfer device; and transferring, by the transfer device, a received voice super frame to the target mobile station group at the transfer timeslot; or in a case that the service type is a voice service and the control information is a fast activate control frame generated based on a standard voice header, the transferring, by the transfer device, information between the first mobile station and a target mobile station group at the transfer timeslot, comprises: transmitting, by the transfer device, the fast activate control frame or a standard voice header reconstructed based on the fast activate control frame to the target mobile station group, so that the target mobile station group gets ready for communications based on a voice service type and a control signaling corresponding to the voice service carried in the fast activate control frame or the standard voice header; receiving, by the transfer device, a voice super frame transmitted by the first mobile station at a timeslot at which the fast activate control frame is transmitted; and transferring, by the transfer device, a received voice super frame to the target mobile station group at the transfer timeslot.

6. The method according to claim 5, wherein in a case that the service type is a voice service, after the target mobile station group gets ready for communications, in a case that the voice super frame transmitted by the first mobile station to the transfer device is a voice super frame carrying a fast activate embedded voice header generated based on the standard voice header, the method further comprises:

reconstructing, by the transfer device, a standard voice header based on the fast activate embedded voice header carried in the voice super frame, and transferring a voice super frame carrying a reconstructed standard voice header to the target mobile station group.

7. The method according to claim 5, after the transfer device receives the control information transmitted by the first mobile station, comprising:

for a non-voice service, receiving, by the transfer device, a standard preamble control frame at a timeslot at which the control information is transmitted by the first mobile station; and for a voice service, receiving, by the transfer device, a standard voice header at a timeslot at which the control information is transmitted by the first mobile station; and transferring, by the transfer device, a received standard voice header or a received standard preamble control frame to the target mobile station group at a transfer timeslot after the transfer device determines the transfer timeslot based on the control information; transferring, by the transfer device, the received standard voice header or the received standard preamble control frame to the target mobile station group at a default timeslot of the transfer device, in a case that the transfer device does not receive the control information or is unable to identify the control information.

* * * * *